(12) United States Patent
Waitz

(10) Patent No.: US 8,904,598 B2
(45) Date of Patent: Dec. 9, 2014

(54) SWIVEL CASTER FOR SUITCASES, ITEMS OF LUGGAGE, TRANSPORT CONTAINERS OR THE LIKE

(75) Inventor: Karl-Heinz Waitz, Iserlohn (DE)

(73) Assignee: Sudhaus GmbH & Co. KG, Iserlohn (DE)

( * ) Notice: Subject to any disclaimer, the term of this patent is extended or adjusted under 35 U.S.C. 154(b) by 0 days.

(21) Appl. No.: 13/701,500

(22) PCT Filed: Jun. 15, 2011

(86) PCT No.: PCT/EP2011/002958
§ 371 (c)(1),
(2), (4) Date: Dec. 31, 2012

(87) PCT Pub. No.: WO2012/003923
PCT Pub. Date: Jan. 12, 2012

(65) Prior Publication Data
US 2013/0111700 A1    May 9, 2013

(30) Foreign Application Priority Data

Jul. 9, 2010   (DE) ..................... 20 2010 010 103 U

(51) Int. Cl.
*B60B 33/00*     (2006.01)
*B60B 33/04*     (2006.01)
*A45C 5/14*      (2006.01)

(52) U.S. Cl.
CPC ................ *B60B 33/045* (2013.01); *A45C 5/14* (2013.01); *B60B 33/001* (2013.01); *B60B 33/0023* (2013.01); *B60B 33/0026* (2013.01); *B60B 33/0039* (2013.01); *B60B 33/0042* (2013.01); *B60B 33/0049* (2013.01); *B60B 33/0057* (2013.01); *B60B 33/0068* (2013.01); *B60B 33/0076* (2013.01); *B60B 2900/131* (2013.01); *B60B 2900/133* (2013.01); *B62B 2301/05* (2013.01); *B62B 2301/20* (2013.01)
USPC ............................................... 16/20; 16/35 R

(58) Field of Classification Search
CPC .. B60B 33/0002; B60B 33/021; B60B 33/02; B60B 33/045; B60G 11/22; B60G 2204/41; A47C 3/0252; F16F 1/3732; F16F 1/50; F16F 13/08
USPC .................. 16/35 R, 35 D, 44, 20; 190/18 A; 240/580, 599, 129; 248/580, 599, 129
See application file for complete search history.

(56) References Cited

U.S. PATENT DOCUMENTS 1,247,827 A * 11/1917 Hansen ............................. 16/19
1,409,150 A *  3/1922 Blood ................................ 16/44

(Continued)

FOREIGN PATENT DOCUMENTS

| DE | 1898067 U | 8/1964 |
| EP | 0075910 A | 4/1983 |
| EP | 0087564 A | 9/1983 |

*Primary Examiner* — Victor Batson
*Assistant Examiner* — Jason W San
(74) *Attorney, Agent, or Firm* — Andrew Wilford

(57) ABSTRACT

A swivel caster (1) for suitcases, items of luggage, transport containers or the like has at least one wheel (8) which is rotatably received about an axis of rotation (14), and a steering axle (6) which is arranged approximately at a right angle to the axis of rotation (14) of the at least one wheel (8) and about which the at least one wheel (8) can be steered. The aim of the invention is to reduce the transmission of vibrations, running noises and jolts and bumps onto the suitcase, the item of luggage, the transport container or the like. The swivel caster (1) comprises an elastic damping element (7) which is mounted between the wheel (8) of the swivel caster (1) and a fastening element (3) of the swivel caster (1) on the suitcase side.

3 Claims, 2 Drawing Sheets

(56) References Cited

U.S. PATENT DOCUMENTS

| | | | | |
|---|---|---|---|---|
| 1,614,894 | A | * | 1/1927 | Nelson et al. ............... 16/18 R |
| 1,649,529 | A | * | 11/1927 | Herold ............................ 16/44 |
| 1,727,976 | A | * | 9/1929 | Herold ............................ 16/44 |
| 1,745,992 | A | * | 2/1930 | Herold ............................ 16/44 |
| 1,879,429 | A | * | 9/1932 | Noelting et al. ................ 16/21 |
| 2,647,277 | A | * | 8/1953 | Christensen .................... 16/44 |
| 2,659,100 | A | * | 11/1953 | Cramer ........................... 16/22 |
| 3,210,795 | A | * | 10/1965 | Fontana et al. ................. 16/43 |
| 3,768,116 | A | * | 10/1973 | Propst et al. ................... 16/43 |
| 3,988,800 | A | * | 11/1976 | Sachser ........................ 16/35 R |
| 4,054,964 | A | * | 10/1977 | Kaneko ........................... 16/20 |
| 4,084,288 | A | * | 4/1978 | Black .............................. 16/21 |
| 4,346,498 | A | * | 8/1982 | Welsch et al. .................. 16/44 |
| 4,361,930 | A | * | 12/1982 | Seesengood ................... 16/38 |
| 4,649,595 | A | * | 3/1987 | Shane ....................... 16/18 CG |
| 4,658,466 | A | * | 4/1987 | Vollberg et al. ............. 16/35 R |
| 4,719,664 | A | * | 1/1988 | Berfield .......................... 16/47 |
| 4,969,232 | A | * | 11/1990 | Michel .......................... 16/350 |
| 5,109,569 | A | * | 5/1992 | Shaw .............................. 16/44 |
| 5,259,088 | A | * | 11/1993 | Yang ............................... 16/47 |
| 5,400,469 | A | * | 3/1995 | Simonsen ........................ 16/44 |
| 5,568,671 | A | * | 10/1996 | Harris et al. ................. 16/18 R |
| 6,353,948 | B1 | * | 3/2002 | Bolden et al. ................... 5/600 |
| 6,425,161 | B1 | * | 7/2002 | LeMeur et al. ................. 16/44 |
| 6,499,184 | B2 | * | 12/2002 | Plate ............................... 16/44 |
| 6,584,641 | B1 | * | 7/2003 | Milbredt ..................... 16/35 R |
| 6,810,560 | B1 | * | 11/2004 | Tsai ............................ 16/35 R |
| 7,353,566 | B2 | * | 4/2008 | Scheiber et al. ................ 16/19 |
| 7,546,908 | B2 | * | 6/2009 | Chang ......................... 188/1.12 |
| 7,681,702 | B2 | * | 3/2010 | Miyoshi ...................... 190/18 A |
| 8,205,297 | B2 | * | 6/2012 | Fallshaw et al. ............ 16/35 R |
| 8,220,110 | B1 | * | 7/2012 | Chen ........................... 16/35 R |
| 8,365,354 | B1 | * | 2/2013 | Fan ............................. 16/35 R |
| 8,418,315 | B1 | * | 4/2013 | Lin et al. ..................... 16/35 R |
| 2003/0150080 | A1 | * | 8/2003 | Yang ............................... 16/47 |
| 2003/0167597 | A1 | * | 9/2003 | Tsai ............................ 16/35 R |
| 2005/0115021 | A1 | * | 6/2005 | Tsai ............................ 16/31 R |
| 2009/0019670 | A1 | * | 1/2009 | Tsai ............................ 16/35 R |
| 2012/0255141 | A1 | * | 10/2012 | Lin et al. .......................... 16/45 |
| 2013/0111700 | A1 | * | 5/2013 | Waitz .............................. 16/44 |

* cited by examiner

SWIVEL CASTER FOR SUITCASES, ITEMS OF LUGGAGE, TRANSPORT CONTAINERS OR THE LIKE

CROSS REFERENCE TO RELATED APPLICATIONS

This application is the US-national stage of PCT application PCT/EP2011/002958 filed 15 Jun. 2011 and claiming the priority of German patent application 202010010103.4 itself filed 9 Jul. 2010.

FIELD OF THE INVENTION

The invention relates to a caster for suitcases, pieces of luggage, transport containers or the like, with at least one wheel that is mounted rotatably about an axis of rotation and an axle that is arranged approximately perpendicularly to the axis of rotation of the at least one wheel, and around which the at least one wheel can be pivoted.

BACKGROUND OF THE INVENTION

Suitcases are provided relatively often with such casters in order to allow simple and comfortable movability of the suitcase, particularly when it is completely filled.

From EP 0 874 564, a suitcase having such casters is known in which the axle around which a wheel support with a wheel turns, is firmly anchored in an axle support that itself is firmly attached by means of appropriate attachment elements to the suitcase shell.

Both the axle support and also the axle firmly anchored therein are made from a hard and rigid material, so that the wheels, particularly when loaded transversely with respect to the axle of the swiveling roller, do not slide against the suitcase-side housing portion that holds or receives the swiveling roller. In the case of such casters, due to the rigid connection between the axle, on the one hand, and the axle support, on the other hand, and due to the hard and stiff materials from which the mentioned components are made, vibrations and running noises of the wheels are easily transmitted to the suitcases and amplified there.

OBJECT OF THE INVENTION

Based on the above described prior art, the invention is based on the problem of providing a caster for suitcases, pieces of luggage, transport containers or the like, in which the transmission of vibrations, running noises as well as shocks and impacts on the suitcase, the piece of luggage, the transport container or the like is minimized.

SUMMARY OF THE INVENTION

This problem is solved according to the invention in that the caster presents an elastic damping element that is arranged between the wheel of the caster, on the one hand, and a suitcase-side attachment portion of the caster, on the other hand. Any vibrations, running noises or shock and/or impact stresses that occur on the wheels are absorbed by this elastic damping element, and are not transmitted to the suitcase or transmitted only in a relatively small proportion.

In an advantageous embodiment of the caster according to the invention, the axis of rotation of the wheel and the axle of the swiveling roller are arranged with offset with a predetermined separation.

The elastic damping element can be designed advantageously and at low technical construction cost as an elastomeric damping element.

According to an embodiment, the elastic damping element can be arranged on the suitcase-side end section of the axle between the axle and the suitcase-side attachment portion of the caster, which is designed as a axle support.

Moreover, it is possible that the elastic damping element or a different, additional elastic damping element is arranged on the wheel-side end section of the axle between the axle and a wheel support that mounts the wheel rotatably about its axis of rotation. The damping effect can be damped between the wheel support and the axle in this manner, wherein, in the embodiment with two elastic damping elements, the damping can be absorbed onto these two elastic damping elements, of which one is arranged on the wheel support side and the other on the axle support side.

Advantageously, the elastic damping element encloses the suitcase-side or the wheel-side end section of the axle at least partially, preferably completely or nearly completely. As a result, the possibility is prevented with great reliability that application contacts between the axle and the axle support or the wheel support can occur.

The axle can be anchored non-rotatably on the axle support or non-rotatably on the wheel support.

To prevent damage of the wheel or of the axle support or of the suitcase shell, it is advantageous if a abutment that protrudes toward the wheel or the wheel support is formed on the axle support, by means of which element a movement of the wheel or of the wheel support in the direction toward the axle support can be delimited in such a manner that a contact between the wheel and the axle support is ruled out.

In order to reliably rule out any damage in terms of the function of important components of the wheel support it is advantageous if a wheel support-side abutment lug is associated with the axle support-side abutment, lug against which the abutment abuts.

When the caster, between the elastic damping element and the end section of the axle, has a bushing-shaped adhesion element that, on the one hand, adheres firmly to the elastic damping element, and on the other hand, is firmly anchored on the end section of the axle, a better adhesion of the elastic damping element on the end section of the axle is achieved, since the adhesion element, on the one hand, can be formed optimally for adhesion to the damping element, and, on the other hand, optimally for a reliable and firm anchoring on the end section of the axle.

For this purpose, the bushing-shaped adhesion element is advantageously formed from a plastic that is relatively hard in comparison to the material or to the plastic of the damping element.

The reliable anchoring between the axle, on the one hand, and the bushing-shaped adhesion element, on the other hand, can be qualitatively increased by forming, in the respective end section of the axle, undercuts or annular recesses into which the associated form elements or annular projections of the adhesion element protrude or project.

BRIEF DESCRIPTION OF THE DRAWING

The invention is explained in greater detail below with reference embodiments shown in the drawing.

SPECIFIC DESCRIPTION OF THE INVENTION

Figure 1:
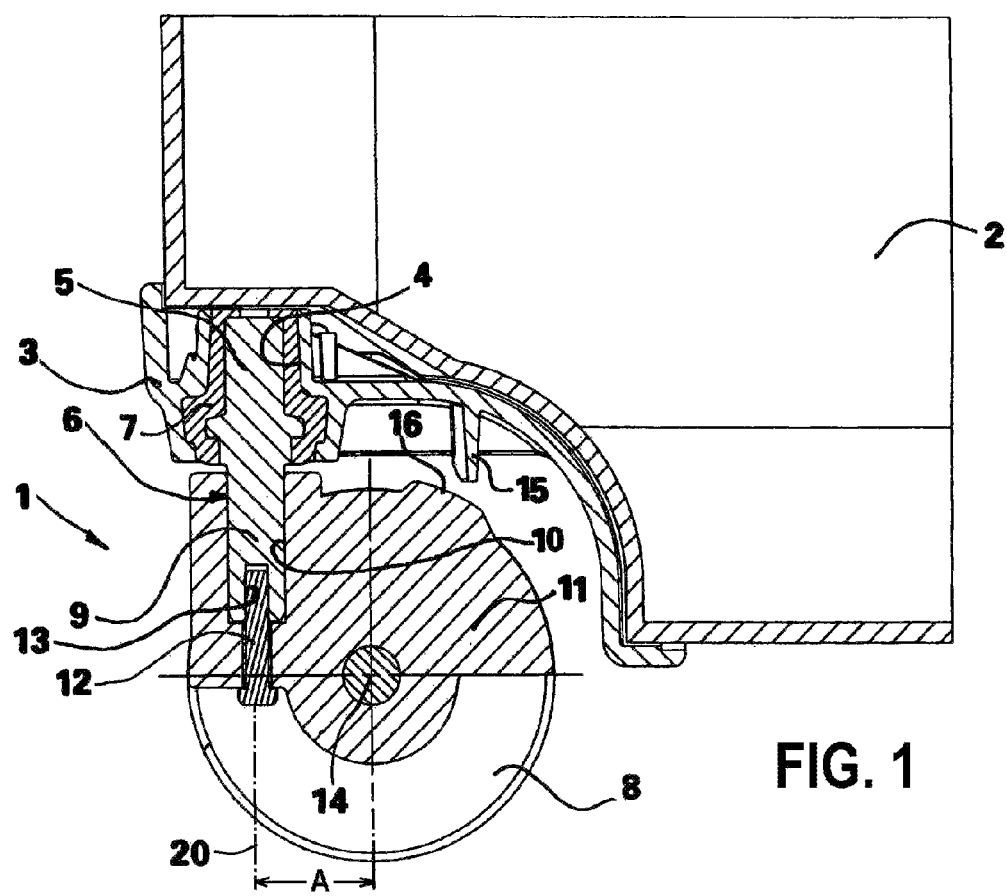
FIG. 1 shows a cross-sectional representation of an embodiment of a caster according to the invention.

A caster 1 shown in FIG. 1 is used to move or maneuver in a controlled manner suitcases, similar pieces of luggage, transport containers or the like, working together with at least one additional caster and optionally non-steerable swiveling rollers. For this purpose, two such casters 1 are usually provided on two adjacent corners of a suitcase of which only a portion of the suitcase shell 2 is shown in the figures.

As one can see in FIG. 1, the suitcase shell 2 has a recess at an end, in which the caster 1 is accommodated. The caster 1 is associated with a axle support 3 by means of which the caster 1 is attached to the corner of the suitcase shell 2.

The axle support 3 forms an upper seat 4 in which a suitcase-side end section 5 of a axle 6 of the caster 1 is non-rotatably anchored.

Between the axle support-side upper seat 4, on the one hand, and the suitcase-side end section 5 of the axle 6 on the other hand is an elastomeric damping element 7 that nearly completely encloses the suitcase-side end section or upper part 5 of the axle 6, so that no direct contact between the suitcase-side end section 5 of the axle 6 and the seat 4 of the axle support 3 can occur.

The axle 6 projects out of the seat 4 of the axle support 3 toward a wheel 8 of the caster 1. On its wheel-side end section or lower part 9, the axle 6 is axially secured but rotatable in a lower seat 10 of a wheel support 11. The attachment of the wheel-side end section 9 of the axle 6 in the seat 10 of the wheel support 11 is implemented in the illustrated embodiment by a retaining pin 12 that projects from below into the seat 10 of the wheel support 11 and is attached there in a seat 13 in the wheel-side end of the axle 6. The axle 6 or its wheel-side end section 9 and the retaining pin 12 can rotate relative to the wheel support 11, or the wheel support 11 can rotate around the axle 6.

The wheel support 11 defines an axis of rotation 14 around which the wheel 8 can rotate. The rotation axis 14 is offset by a spacing A from an axis 20 of the axle 6 of the caster 1, which is perpendicular to the wheel rotation axis 14.

The axle support 3 has on its bottom face that faces the wheel support 11 or the wheel 8 an abutment 15 associated with an abutment lug 16 on the surface of the wheel support 11 that faces the axle support 3, so that even in the case of a heavily loaded suitcases and relatively large shock and impact stresses from outside on the wheel 8, the wheel 8 does not engage directly against the suitcase shell 2 or the axle support 3.

Any vibrations, running noises, shock or impact stresses occurring due to the operation of the caster 1 are not transmitted, due to the elastomeric damping element 7 provided between the suitcase-side end section 5 of the axle 6, on the one hand, and the seat 4 of the axle support 3, on the other hand, or are transmitted only to a relatively small extent to the suitcase shell 2.

In an alternative embodiment of the caster according to the invention, the elastomeric damping element 7 can also be provided between the wheel-side end section 9 of the axle 6 and the seat 10 of the wheel support 11. In this case, the axle 6 is not rotatable relative to the wheel support 11.

Figure 2:
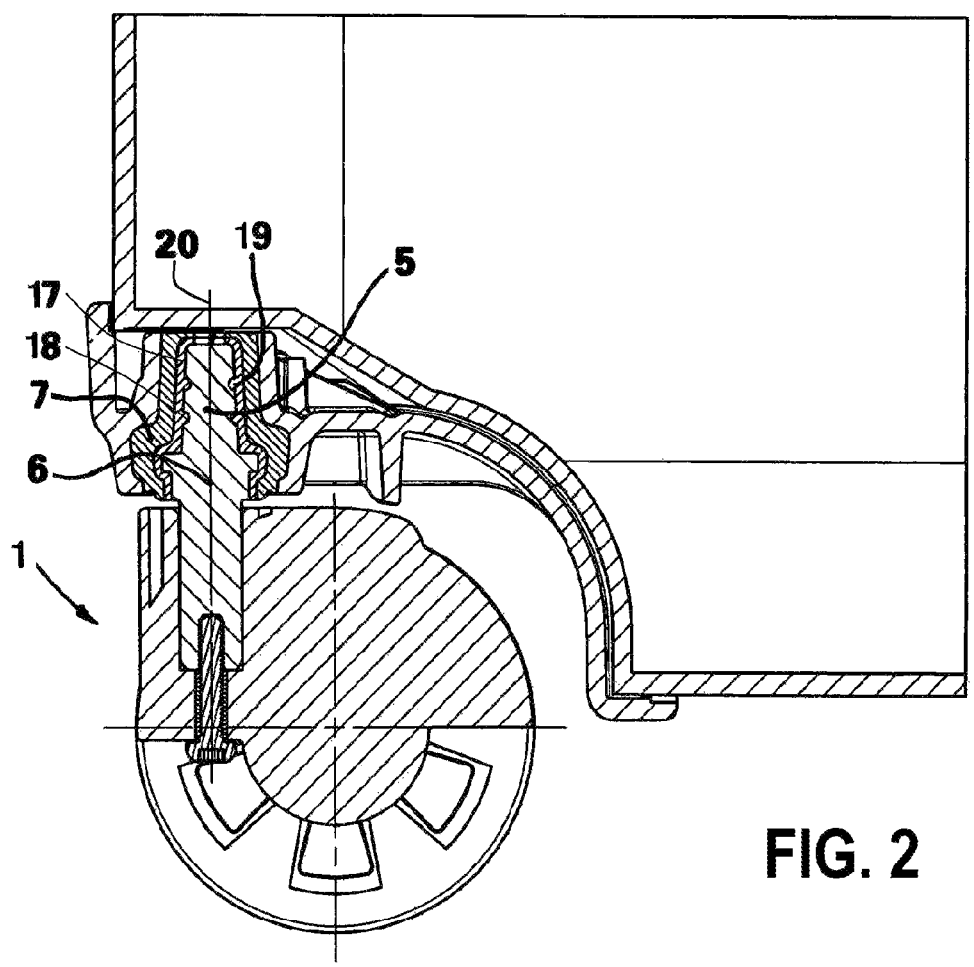
FIG. 2 shows a cross-sectional representation of an additional embodiment of the caster according to the invention.

In an additional embodiment shown in FIG. 2 of the caster 1 according to the invention, a mounting bushing 17 is provided between the suitcase-side end section 5 of the caster 6 and the rubber-elastic damping element 7. This bushing 17 is made of a plastic that is relatively hard in comparison to the material or to the plastic of the elastomeric damping element 7. The bushing-shaped adhesion element 17 ensures improved adhesion or anchoring between the elastomeric damping element 7, on the one hand, and the suitcase-side end section 5 of the axle 6, on the other hand. The bushing 17 is mounted on its portion associated with the suitcase-side end section 5 of the axle 6, in such a manner that an optimal anchoring of the bushing 17 on the suitcase-side end section 5 of the axle 6 is achieved. For this purpose, the bushing 17 has annular projections 19 extending into annular recesses 18 formed on the end section 5 of the steering shaft 6 and in this manner form a positive locking connection between the suitcase-side end section 5 of the axle 6 on the one hand and the bushing-shaped adhesion element 17 on the other hand. On its side associated with the elastomeric damping element 7, the bushing 17 is formed in such a manner that an ideal adhesion of the bushing 17 on the elastomeric damping element 7 can be achieved.

The invention claimed is:

1. In combination with a piece of luggage having an axle support formed with a downwardly open upper seat, a caster comprising:
    a wheel support formed with an upwardly open lower seat defining a pivot axis and axially aligned therealong with the upper seat;
    an abutment formed on the axle support and projecting toward the wheel support such that movement of the wheel support toward the axle support can be delimited in such a manner that contact between the wheel and the axle support is prevented;
    a lug on the wheel support and juxtaposed with and bearing on the abutment;
    at least one wheel rotatable about a wheel rotation axis on the wheel support;
    an axle extending along the pivot axis approximately perpendicular to the wheel rotation axis and having an upper part engaged in the upper seat and a lower part rotatable about the pivot axis and axially fixed in the lower seat of the wheel support;
    an elastic damping element engaged between the upper part of the axle and upper seat of the axle support; and a mounting bushing carried on the upper part of the axle, fixed in the damping element, made from a plastic that is hard in comparison to a material forming the damping element, and axially and rotationally fixed on the upper part of the axle.

2. The caster according to claim 1, wherein the wheel rotation axis is spaced radially of the pivot axis.

3. The caster according to claim 1, wherein the upper part of the axle is formed with an peripheral annular recess into which an annular projection of the abutment extends.

* * * * *